(12) United States Patent
Cohn

(10) Patent No.: US 10,856,062 B1
(45) Date of Patent: Dec. 1, 2020

(54) SOUND BOOM POLE SUPPORT RIG

(71) Applicant: Jared Cohn, Sherman Oaks, CA (US)

(72) Inventor: Jared Cohn, Sherman Oaks, CA (US)

( * ) Notice: Subject to any disclaimer, the term of this patent is extended or adjusted under 35 U.S.C. 154(b) by 0 days.

(21) Appl. No.: 16/539,992

(22) Filed: Aug. 13, 2019

(51) Int. Cl.
*F16M 13/04* (2006.01)
*H04R 1/08* (2006.01)

(52) U.S. Cl.
CPC ............. *H04R 1/08* (2013.01); *F16M 13/04* (2013.01); *F16M 2200/066* (2013.01)

(58) Field of Classification Search
CPC .... H04R 1/08; F16M 13/04; F16M 2200/066; G03B 17/561; B66F 11/048
USPC .................................................. 381/362, 364
See application file for complete search history.

(56) References Cited

U.S. PATENT DOCUMENTS

| | | | | | |
|---|---|---|---|---|---|
| 2,122,778 | A | * | 7/1938 | Mueller ................ | H04R 1/08 |
| | | | | | 248/125.9 |
| 2,421,437 | A | * | 6/1947 | Ryan .................... | F16M 11/42 |
| | | | | | 381/362 |
| 4,037,763 | A | * | 7/1977 | Turchen ............... | F16M 13/04 |
| | | | | | 224/153 |
| 4,206,983 | A | * | 6/1980 | Nettman ............... | A45F 3/10 |
| | | | | | 224/201 |
| 4,976,387 | A | * | 12/1990 | Spianti ................. | F16M 13/04 |
| | | | | | 224/262 |
| 5,454,042 | A | * | 9/1995 | Drever ................. | F16M 13/04 |
| | | | | | 381/361 |
| 5,940,645 | A | * | 8/1999 | Bonin ................... | B66F 11/048 |
| | | | | | 352/243 |
| 6,257,633 | B1 | * | 7/2001 | Katz ..................... | A45C 13/38 |
| | | | | | 224/266 |
| 6,450,377 | B1 | * | 9/2002 | Oriolo .................. | F16M 13/04 |
| | | | | | 224/201 |
| 8,567,952 | B2 | * | 10/2013 | Taylor .................. | H04N 5/225 |
| | | | | | 352/243 |
| 8,657,507 | B2 | * | 2/2014 | Di Leo ................. | F16M 13/04 |
| | | | | | 396/420 |
| 8,985,878 | B2 | * | 3/2015 | Di Leo ................. | F16M 13/04 |
| | | | | | 396/422 |
| 9,513,536 | B2 | * | 12/2016 | Hellsten .............. | G03B 17/561 |
| 9,690,166 | B1 | * | 6/2017 | Sanders ................ | F16M 13/04 |
| D808,693 | S | * | 1/2018 | Belitz ........................ | D6/682.5 |
| 10,077,869 | B2 | * | 9/2018 | Semple ..................... | F41H 5/08 |
| 10,178,295 | B2 | * | 1/2019 | Zeng ........................ | G03B 3/12 |
| 2008/0304687 | A1 | * | 12/2008 | Howell .................... | H04R 1/08 |
| | | | | | 381/362 |
| 2019/0346747 | A1 | * | 11/2019 | Teichman ............ | F16M 11/2092 |

* cited by examiner

*Primary Examiner* — Justin M Larson

(57) ABSTRACT

A wearable rig system for supporting an overhead boom is provided. The system comprises a body harness attachable to a back area and a shoulders area of a user and a backplate attached to a backward facing surface of the harness. The system also comprises a back-bottom hinge plate attached via hinges to the backplate and horizontal arm poles that upon receipt of downward pressure exert upward force on the hinge plate and cause a far end of an overhead boom to move downward. The arm poles, upon receipt of upward pressure, exert downward force on the hinge plate and cause the far end of the overhead boom to move upward. The boom is positioned over the user's head and by default parallel to a flat surface supporting the user, is perpendicular to the user's shoulders, and extends to the far end several feet in front of the user.

20 Claims, 3 Drawing Sheets

SOUND BOOM POLE SUPPORT RIG

FIELD OF THE INVENTION

The present invention is in the field of audio recording equipment. More particularly, the present disclosure provides a wearable rig including an overhead boom extending in front of the user wherein the far end may be titled upward and downward and an angle of a microphone suspended from the far end may be adjusted and temporarily fixed.

BACKGROUND

Microphones used in professional recording sessions are typically suspended by long boom poles. A person holds the boom overhead with his/her arms fully extended and his/her head turned at a ninety-degree angle. This is fatiguing to most persons after not long as a typical boom is long and heavy and must be held steady during extended takes. Such persons may develop back and shoulder problems that require physical therapy or more serious medical care.

DETAILED DESCRIPTION

Figure 1:
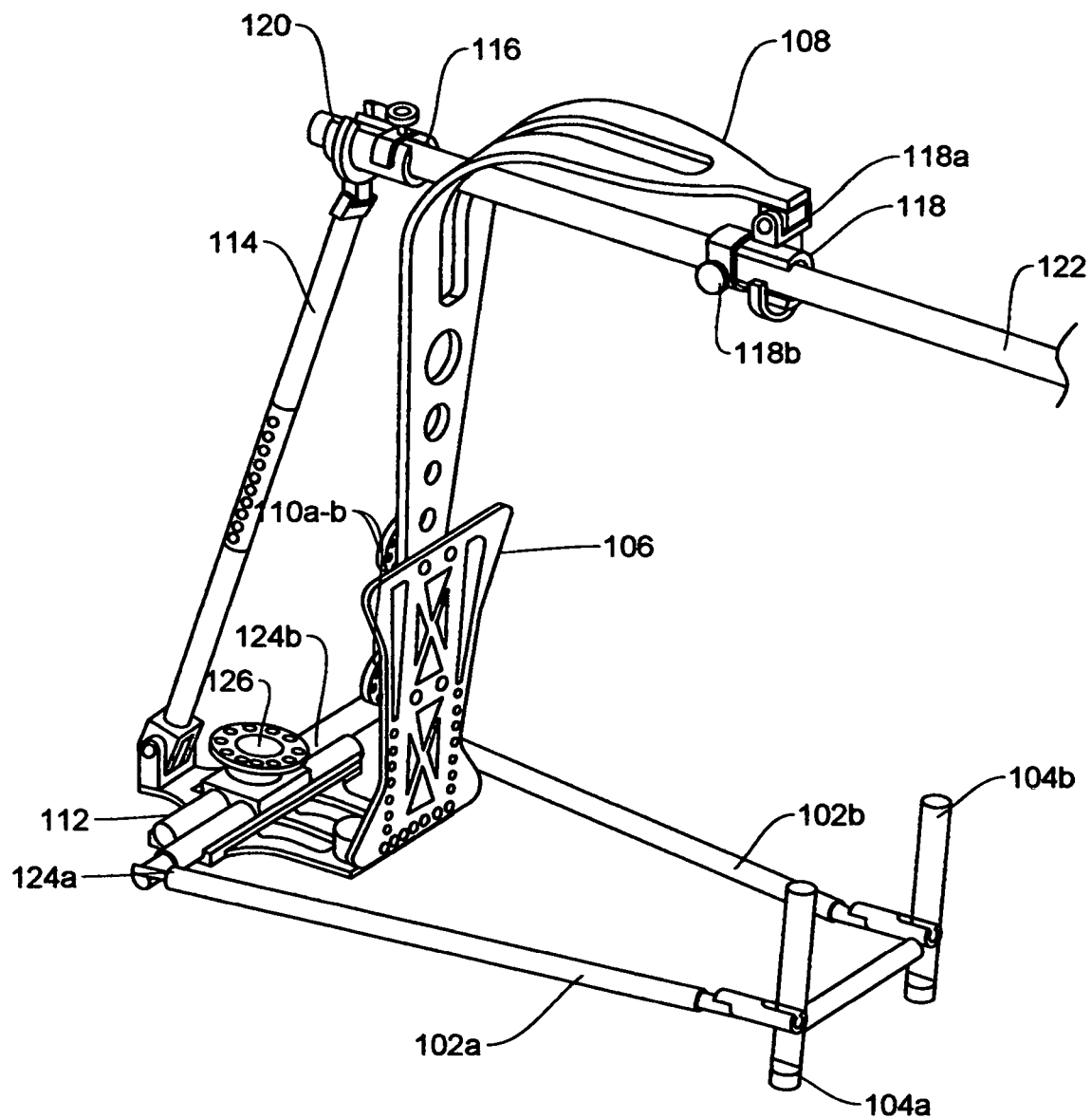
FIG. 1 is a diagram of a sound boom pole support rig according to an embodiment of the present disclosure.

Systems and methods described herein provide a wearable rig that supports an overhead boom and a microphone suspended from a far end of the boom. The far end of the boom, which extends perpendicularly to a user's shoulder line, may be titled up and down to allow positioning of the microphone closer to a person speaking or to another source of sound. The angle of the microphone as it is suspended downward from the boom's far end may also be altered for better sound recording.

The rig includes arm poles that extend horizontally upon which the user places his/her forearms. When the user applies downward pressure on the arm poles, components directly and indirectly connected to the arm poles cause the far end of the boom to tilt downward, thus lowering the microphone. Conversely, when the user applies upward pressure on the arm poles, the far end of the boom is moved upward, thus raising the microphone.

Handles are attached at the ends of each arm pole. The user by moving the handles may cause the microphone to change the angle at which it is suspended from the far end of the boom. A range of 180 degrees of such angling may be provided. As noted, this action may allow the microphone to be positioned closer to a speaker and may further allow the microphone to effectively be toggled back and forth between two or more persons positioned opposite each other and possibly engaging in a conversation.

Cables extend from the handles at least one of inside and outside the arm poles to an area behind and above the user and finally to a rotating mechanism. The rotating mechanism is attached to the near end of the boom which is just above and behind the user's head. Turning of the rotating mechanism via movement of the handles and action of the cables causes the entire boom to rotate on its cylindrical axis. This action enables the microphone suspended at the far end of the boom to be positioned at a selected angle.

The components described herein attach directly or indirectly to a backplate positioned against the user's back. The backplate is coupled to a harness resembling a backpack that is adjustable about the user's body using Velcro straps. The weight of the rig is consequently borne by the user's shoulders, allowing for more extended audio recording sessions and more comfort for the user.

An arm attached to the backplate extends up and over the user's head. The boom is held over the user's head by the upper end of the arm. The arm's position vis a vis the backplate may be adjusted based on the height of the user and other considerations.

During use, the forearms of the user or operator are in a horizontal position at or slightly above the waistline but never close to the user's head. The user's vision is unobstructed as nearly all components of the rig are either behind or above the user. The ability to clearly view the action promotes reduction of the user's fatigue as the microphone is clearly visible to the rig user and can be properly positioned and held above the actors but close enough to record their speaking.

The user is relieved of the need to rotate his/her neck and maintain this position for an extended period to keep the speaker in view as is the case with traditional overhead handheld microphone booms.

Turning to the figures, FIG. 1 is a diagram of a sound boom pole support rig in accordance with an embodiment of the present disclosure. FIG. 1 illustrates components and interactions of a system 100.

The system 100 comprises arm poles 102a-b, handles 104a-b, a backplate 106, a support arm 108, knobs 110a-b, a back-bottom hinge plate 112, a push bar 114, a back-boom support mechanism 116, a cradle 118, a rotating mechanism 120, and a boom 122. The back-bottom hinge plate 112 and the back-boom support mechanism 116 may be referred to as the hinge plate 112 and the support mechanism 116, respectively, for brevity purposes.

The system also comprises adjustment bars 124a-b and an adjustment wheel 126. The system further comprises cables, a microphone, and a harness that are not depicted in FIG. 1. The boom 122 is not fully depicted in FIG. 1 due to space restriction reasons of the figure. The boom 122 extends further outward and over the user's head for several more feet than are shown in FIG. 1. The microphone extends downward from the end of the boom 122.

The backplate 106 is positioned against the user's back and is attached to the harness. The harness is similar to a backpack and has straps for setting the fit and comfort of the harness on the user's upper body. The harness allows the weight of the system to be borne by the user's shoulders. The user's arms bear little or no weight and are free to manipulate the arm poles 102a-b and the handles 104a-b.

The hinge plate 112 is attached to the bottom of the backplate 106 via at least one hinge. The hinge plate 112 moves up and down in accordance with movements of the arm poles 102a-b. Downward pressure on the arm poles 102a-b causes the hinge plate 112 to angle upward. Upward pressure on the arm poles 102a-b causes the hinge plate 112 to angle downward.

The push bar 114 is a vertical bar positioned on the hinge plate 112 and extending upward to the near end of the boom 122 over the user's head. The push bar 114 connects with the back-boom support mechanism 116 and, based on downward pressure on the arm poles 102a-b, pushes the near end of the boom 122 up, thus causing the far end of the boom 122 and the microphone to tilt downward. The push bar 114 also, based on upward pressure on the arm poles 102a-b, pulls the near end of the boom 122 downward, thus causing the far end of the boom 122 and attached microphone to tilt upward.

The back-boom support mechanism 116 supports the near end of the boom 122 and provides clamping pressure on the boom 122. The boom 122 may rotate by up to 180 degrees on its axis to set an angle of the microphone suspended downward by default at the far end of the boom 122. The back-boom support mechanism 116 effectively holds the near end of the boom 122 as the rotating mechanism 120 turns the boom 122 clockwise or counterclockwise about the axis of the boom 122 to set the angle of the microphone at the far end.

The cradle 118 supports the weight of the boom 122 and effectively serves as a fulcrum for the boom 122. As noted, when the near end of the boom 122 over the user's head is pulled downward by the push bar 114, the far end of the boom 122 in response tilts upward, and the microphone is raised. Conversely, when the near end of the boom over the user's head is pushed upward, the far end of the boom 122 in response tilts downward and the microphone is lowered. The rotating bracket 118a is similar to a fulcrum and allows the near and far ends of the boom 122 to tilt upward and downward.

The locking mechanism 118b clamps the boom with pressure similar to the clamping action of the back-boom support mechanism 116 described above by restricting rotational and other movement of the boom 122. The locking mechanism 118b has a rubber-coated tip to reduce unwanted noise and is associated with a nearby two-piece spring-loaded pivot latch to aid in clamping.

The support arm 108 is attached to the backplate 106 and curves up and over the head of the user. The support arm 108 holds the cradle 118 via the rotating bracket 118a. The support arm 108 holds most of the weight of the boom 122 and microphone. Because the support arm 108 is attached to the backplate 106, it is the user's back instead of other parts of the user's body that support the weight of the boom 122 and microphone.

The knobs 110a-b affix the support arm 108 to the backplate 106. The support arm 108 may be raised or lowered in relation to the backplate 106 to compensate for the height of the user or for other reasons. The knobs 110a-b are loosened to adjust the position of the support arm 108 up or down. The knobs 110a-b are tightened once the desired position of the support arm 108 is set. Thereafter the support arm 108 does not move.

The adjustment bars 124a-b and the adjustment wheel 126 that are positioned on the hinge plate 112 allow for adjustment of distance between the arm poles 102a-b. A feature of the system 100 is that it allows for different sizes of users. Users with broad shoulders or thick upper body may wish the arm poles 102a-b to be relatively far apart while users with narrow shoulders or slender body may wish that the arm poles 102a-b are closer together. By turning the adjustment wheel 126 clockwise or counterclockwise, the adjustment bars 124a-b move outward or inward, thus causing the attached arm poles 102a-b to move further apart or closer to each other, respectively.

Figure 2:
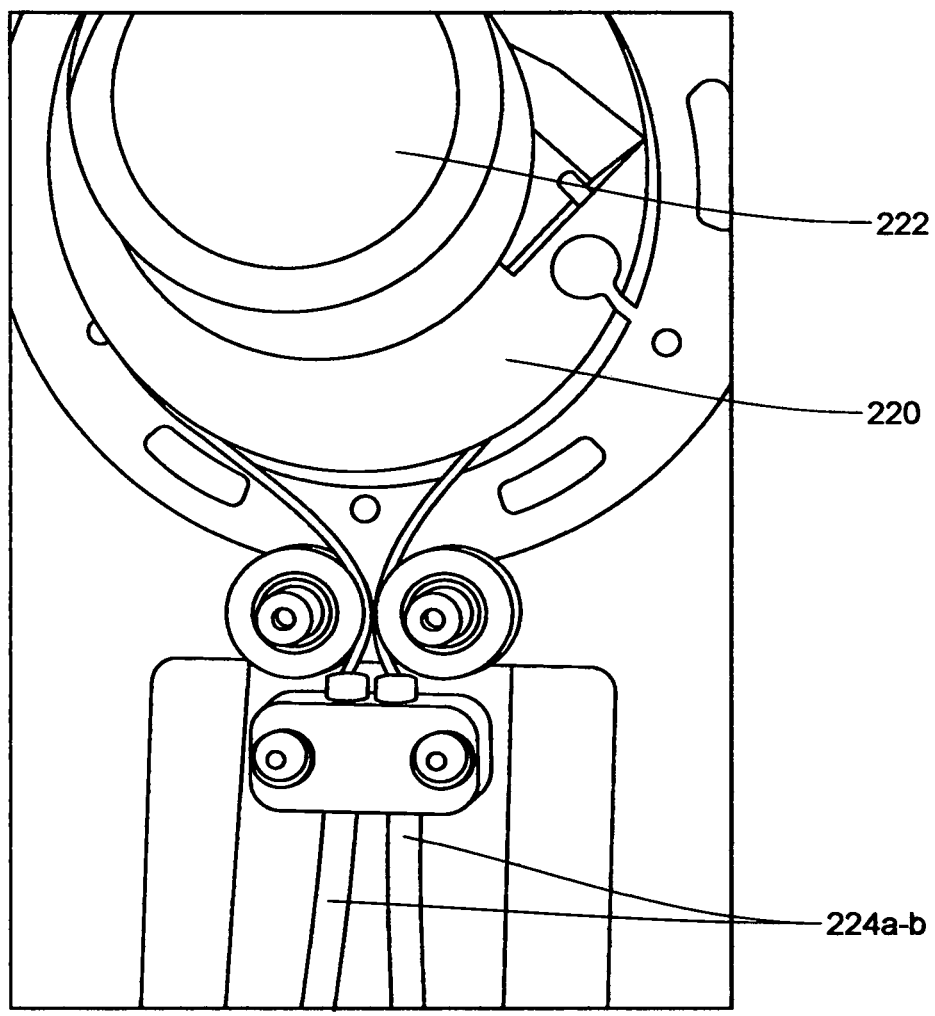
FIG. 2 is a diagram of a sound boom pole support rig according to an embodiment of the present disclosure.

FIG. 2 is a diagram of a sound boom pole support rig in accordance with an embodiment of the present disclosure. Components depicted in FIG. 2 are indexed to the components provided by the system 100 and depicted in FIG. 1. FIG. 2 illustrates the rotating mechanism 220, the boom 222, and cables 224a-b.

The rotating mechanism 220 is attached to the near end of the boom 222. As noted, in addition to moving the far end of the boom 222 upward and downward, systems and methods described herein also provide for changing the downward angle of the microphone as it is suspended from the far end of the boom 222. The cables 224a-b are attached to the handles 104a-b. Cable 224a may be attached to handle 104a, cable 224b may be attached to handle 104b, or vice versa.

As the handles 104a-b are moved backward or forward by the user, the connected cables 224a-b cause the rotating mechanism 220 to turn either clockwise or counterclockwise, thus rotating the boom 222 on its axis and changing the downward angle of the microphone. The user of the rig may, while remaining stationary and not moving the boom 222, change the angle of the microphone, effectively toggling the microphone back and forth in the case of two persons facing each other at a short distance and engaging in a conversation.

The cables 224a-b run alongside the arm poles 102a-b and extend upward behind the user to the rotating mechanism 220. In some embodiments the cables 224a-b may be partially inside the push bar 114.

Figure 3:
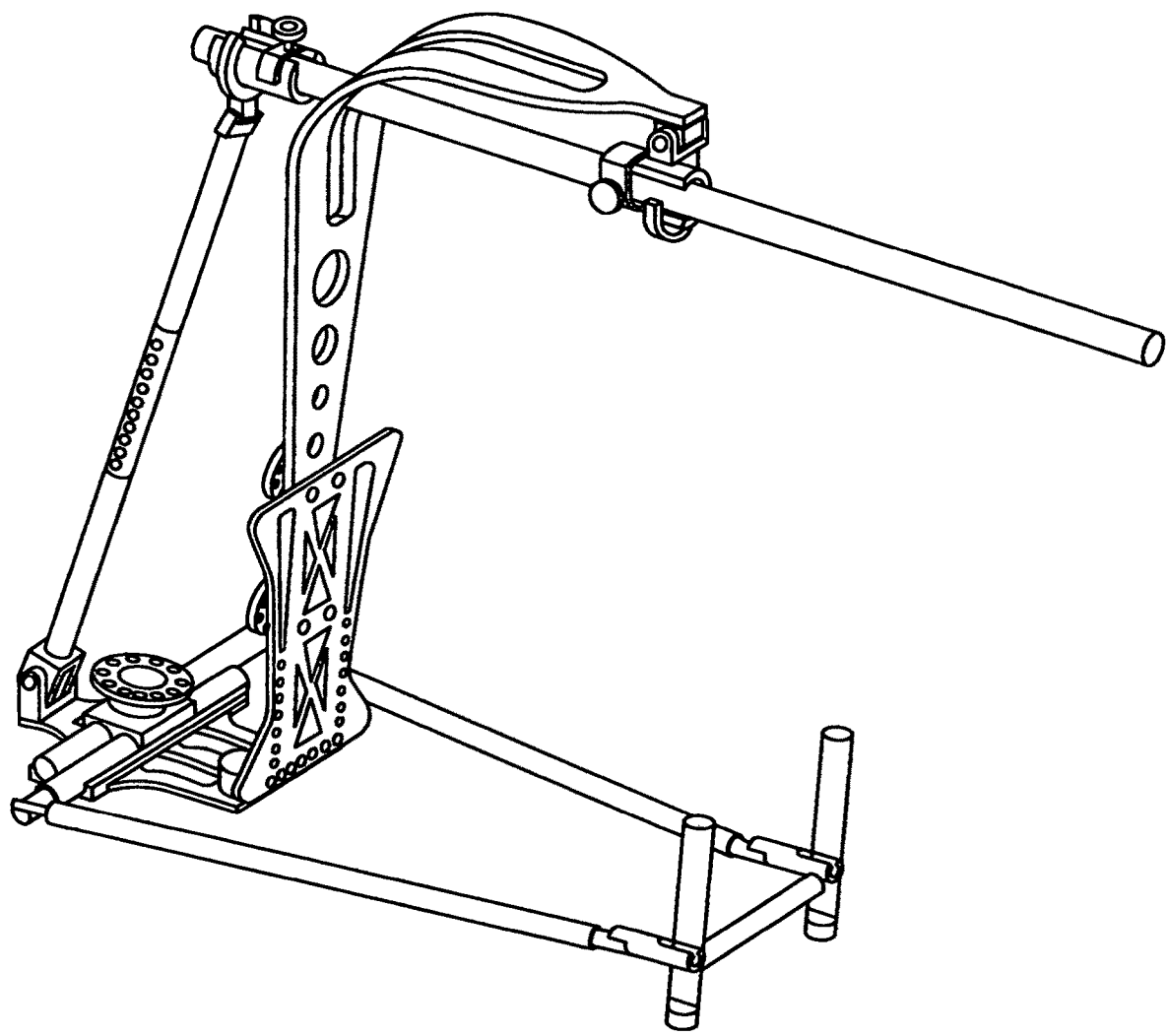
FIG. 3 is a diagram of a sound boom pole support rig according to an embodiment of the present disclosure.

FIG. 3 is a diagram of a sound boom pole support rig in accordance with an embodiment of the present disclosure. FIG. 3 is an expanded view of the system 100 and is provided to depict the full length of the boom 122 which is not shown in FIG. 1

The push bar 114 and the arm poles 102a-b may be made of a lightweight carbon fiber aircraft grade one-inch diameter tubing. The back plate 106 and the hinge plate 112 are made of aircraft grade 70-75 t6 aluminum. The cradle 118 is made of Delrin, a strong and lubricated material. The clamping as described above helps in eliminating noise or vibration that may occur operating the rig. The pivot points on the rig are ball-bearing joints.

Many of the components provided herein are joined using 316 stainless steel bolts. The aluminum parts are anodized with black anodization for aesthetics and protection. The shoulder bolts are made of 316 stainless steel. The cables 224a-b that drive the microphone are made of stainless steel. The microphone is moveable vertically 20 degrees so a user can lift the microphone up 20 degrees and push it down towards the ground at a 40-degree angle. This is based on roughly a 10-15-foot boom length. The grips on the handles 104a-b are made of aluminum.

The harness vest is manufactured from high tech materials and military grade fabrics and provides ergonomic support to the user. The harness vest also uses different grades and different weights of ballistic nylons. The vest provides ergonomic support to the user, allowing 40-45 degree up and down for user arms and 35 degree forward and reverse movement of the handles 104a-b.

In an embodiment, the boom 122 may not suspend a microphone at its far end and may instead suspend another object. For example, a light or a camera may be suspended instead of a microphone. A container holding relatively lightweight objects may also be suspended from the far end of the boom,

What is claimed is:

1. A wearable rig system for supporting an overhead boom, comprising:
   a body harness attachable to a back area and a shoulders area of a user;
   a backplate attached to a backward facing surface of the harness;

a back-bottom hinge plate attached via hinges to the backplate; and horizontal arm poles that upon receipt of downward pressure exert upward force on the hinge plate and cause a far end of an overhead boom to move downward.

2. The system of claim 1, wherein the arm poles, upon receipt of upward pressure, exert downward force on the hinge plate and cause the far end of the overhead boom to move upward.

3. The system of claim 1, wherein the boom is positioned over the user's head and by default parallel to a flat surface supporting the user, is perpendicular to the user's shoulders, and extends from slightly behind the user's head to the far end several feet in front of the user.

4. The system of claim 1, wherein a height of the boom is adjustable.

5. The system of claim 4, wherein the height of the boom is adjustable via an arm moveable up and down via knobs, the knobs coupling the arm to the backplate.

6. The system of claim 1, wherein the arm poles are by default parallel to the ground and parallel to the boom.

7. The system of claim 1, wherein a microphone is attached to and suspended from the far end of the boom.

8. The system of claim 1, wherein handles attached to ends of the arm poles allow adjustment of angles of the microphone relative to the ground.

9. A microphone support and control system, comprising:
an overhead boom with a microphone suspended from a first end of the boom;
a rotating mechanism positioned at a second end of the boom;
arm poles extending horizontally from a wearable rig, the rig supporting the overhead boom and the rotating mechanism; and
two handles, one each attached arm poles, that when moved cause cables to turn the rotating mechanism.

10. The system of claim 9, wherein two cables are provided, one each attached to the handles and extending along each arm pole and up and slightly behind a user to the rotating mechanism.

11. The system of claim 9, wherein movement of the handles in a first direction causes the microphone to turn to a first downward angle and wherein movement of the handles in a second direction causes the microphone to turn to a second downward angle.

12. The system of claim 11, wherein a range of angles for the microphone is 180 degrees.

13. The system of claim 9, wherein a cradle supports and locks the boom in place.

14. The system of claim 9, wherein the wearable rig further comprises a harness with straps promoting attachment of the rig to the user.

15. A method for moving a microphone boom, comprising:
a wearable rig receiving downward pressure on at least one arm pole coupled to the rig;
a hinge plate coupled to the at least one arm pole angling upward based on the downward pressure receive by the at least one arm pole;
a vertical support bar coupled to the hinge plate pushing a first end of a horizontal boom upward based on the upward angling of the hinge plate; and
a second end of the boom moving downward based on the upward movement of the first end.

16. The method of claim 15, further comprising the hinge plate attaching via hinges to a backplate.

17. The method of claim 16, wherein the backplate is attached to a harness component of the wearable rig, the harness component fastened to a user via straps.

18. The method of claim 15, wherein the boom is suspended over the user partially via an adjustable arm attached to the backplate and extending up and over the user.

19. The method of claim 15, wherein the boom is partially held by a back-boom support mechanism coupled to the vertical support bar.

20. The method of claim 15, further comprising the second end moving upward based on upward pressure received on the at least one arm pole.

\* \* \* \* \*